United States Patent

Nakane

[11] Patent Number: 6,025,662
[45] Date of Patent: Feb. 15, 2000

[54] STRUCTURE FOR PREVENTION OF ELECTRICAL LEAKAGE FOR USE IN ELECTRIC POWER TOOLS

[75] Inventor: Shinichi Nakane, Okazaki, Japan

[73] Assignee: Makita Corporation, Japan

[21] Appl. No.: 09/137,433

[22] Filed: Aug. 21, 1998

[30] Foreign Application Priority Data

Aug. 25, 1997 [JP] Japan ................................. 9-228480

[51] Int. Cl.⁷ ...................................................... H02K 7/14
[52] U.S. Cl. ................................................ 310/50; 239/248
[58] Field of Search ............................ 310/248, 50, 239

[56] References Cited

U.S. PATENT DOCUMENTS

| | | | |
|---|---|---|---|
| 3,603,824 | 9/1971 | Csaki | 310/71 |
| 3,919,574 | 11/1975 | Schmuck | 310/68 R |
| 4,069,624 | 1/1978 | Henry, Jr. | 451/441 |
| 4,491,752 | 1/1985 | O'Hara et al. | 310/71 |
| 4,680,495 | 7/1987 | Chiampas et al. | 310/220 |
| 5,443,553 | 8/1995 | Shiga et al. | 74/7 R |
| 5,753,993 | 5/1998 | Steidle et al. | 310/239 |

*Primary Examiner*—Nestor Ramirez
*Assistant Examiner*—Joseph Waks
*Attorney, Agent, or Firm*—Lahive & Cockfield, LLP

[57] ABSTRACT

There is provided a structure (17) for preventing electrical leakage for use in an electric power tool, typically a grinder (1), encased in a split aluminum housing (2, 3, 4) and provided with a commutator motor (5), a pair of brush holders (12) each including a brush (13) pressed against the commutator (6a) of the motor, and a fan (8) driven by rotation of the commutator motor for drawing air from the outside of the electric power tool through a plurality of air inlets (9) formed in the housing. The split housing includes a removable rear cover (4) that can be detachably fitted on the grinder. The structure is a shield (17) that is provided between the brush holders and the air inlets, for blocking air drawn by the fan from the air inlets to the brush holders. The shield is a substantially symmetrical element which includes a center portion (18) clamped between the removable part and the fixed part of the housing having two side edges, a pair of arm portions (19) extending outward from the side edges of the center portion, and a pair of cover portions (20) connected to the arm portions such that the cover portions are positioned close to the brush holders to block air drawn by the fan from the air inlets to the brush holders.

23 Claims, 3 Drawing Sheets

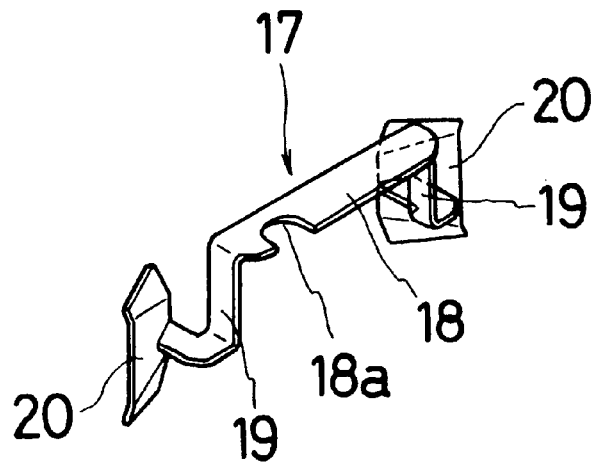
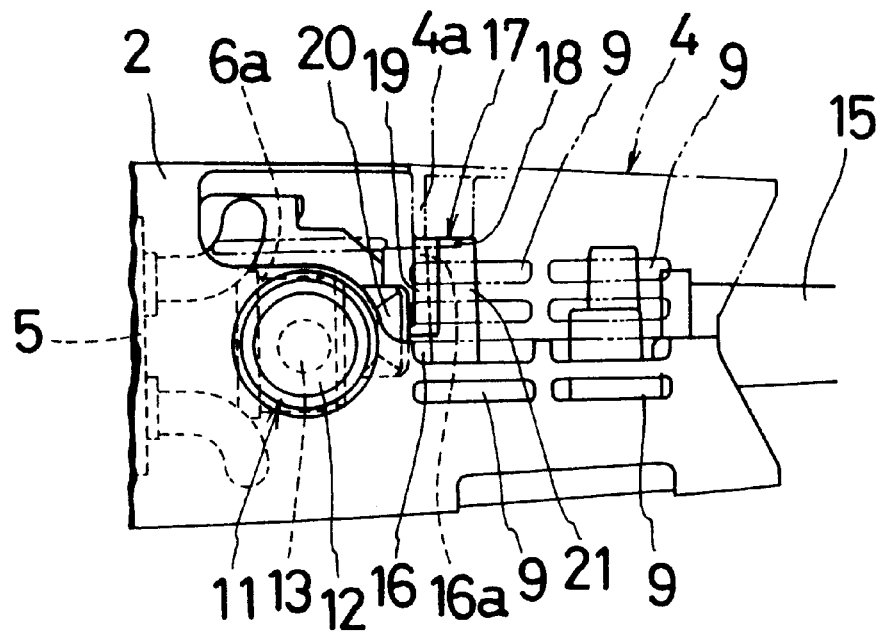

6,025,662

STRUCTURE FOR PREVENTION OF ELECTRICAL LEAKAGE FOR USE IN ELECTRIC POWER TOOLS

BACKGROUND OF THE INVENTION

1. Field of the Invention

The present invention generally relates to a structure for preventing electrical leakage in an electric power tool, and more particularly, to a structure for preventing electrical leakage for use in an electric power tool provided with a commutator motor which is encased in a metal housing.

2. Description of the Related Art

Some electric power tools are provided with a housing made of metal, such as iron or aluminum, to provide sufficient strength against shock and vibration. These electric power tools typically have a commutator motor encased in such a metal housing and a pair of brush holders which press a pair of brushes against the motor to supply power. Additionally, such a tool includes a fan that rotates with the motor to draw air from the outside through air inlets formed in the housing to cool the motor.

While adequate for the purpose intended, this structure for cooling the motor of an electric power tool has certain inherent disadvantages or deficiencies if the tool is a grinder or other device or appliance that generates metal powder, such as iron power, during operation. Ground metal powder is drawn inside the housing and a portion thereof adheres to and is deposited on the brush holders without exiting the tool through air outlets which are provided in the housing. In some cases, the metal power deposit electrically bridges the conductive parts of the brush holders and the housing, thus causing electrical leakage into the housing.

SUMMARY OF THE INVENTION

In view of the above-identified problem, it is an object of the present invention to provide a structure for use in a power tool having a commutator motor that prevents electric leakage from the brush to the housing.

It is another object of the present invention to provide a structure for preventing electric leakage that can be easily mounted in the tool for an electric power tool employing a commutator motor.

The above objects and other related objects are realized by the invention, which provides a structure for preventing electrical leakage for use in an electric power tool provided with a commutator motor which is encased in a housing, a pair of brush holders each including a brush pressed against the commutator of the motor, and a fan driven by rotation of the commutator motor for drawing air from the outside of the electric power tool through at least one air inlet formed in the housing. This structure includes: a shield member, disposed between the brush holders and the at least one air inlet and spaced apart from the brush holders and the at least one air inlet, for blocking air drawn by the fan from the at least one air inlet to the brush holders.

According to one aspect of the present invention, the housing is a split housing which includes a removable part and a fixed part, with the removable part fitted on the electric power tool near the brush holders under normal operating conditions such that, when the removable part is fitted in place, the shield member is clamped between the removable part and the fixed part of the housing.

According to another aspect of the present invention, the shield member is substantially symmetrical and includes a center portion which is clamped between the removable part and the fixed part of the housing and has two side edges. The shield member also includes a pair of arm portions extending outward from the side edges of the center portion and a pair of cover portions connected to the arm portions such that the cover portions are positioned close to the brush holders to block air drawn by the fan from the at least one air inlet to the brush holders when the shield member is clamped in position.

According to still another aspect of the present invention, each of the cover portions is shaped and oriented such that the clearance between the outer surface of the brush holder and the cover portion is minimized.

According to yet another aspect of the present invention, the upper and lower edges of each cover portion are bent towards the brush holder and each cover portion is angled relative to the axis of the commutator motor.

In accordance with another aspect of the present invention, the center portion is a flat plate clamped between the removable part and the fixed part of the housing.

In one practice, the housing is made of metal. Preferably, the material of the housing is selected from a group consisting of aluminum and iron.

BRIEF DESCRIPTION OF THE DRAWINGS

For a fuller understanding of the nature and objects of the present invention, reference should be made to the following detailed description and the accompanying drawings, in which:

FIG. 2 is a perspective view of a metal powder shield of the electric power grinder of FIG. 1;

FIG. 3 is a side view of a rear portion of the electric power grinder of FIG. 1.

DETAILED DESCRIPTION OF THE PREFERRED EMBODIMENTS

Figure 1:
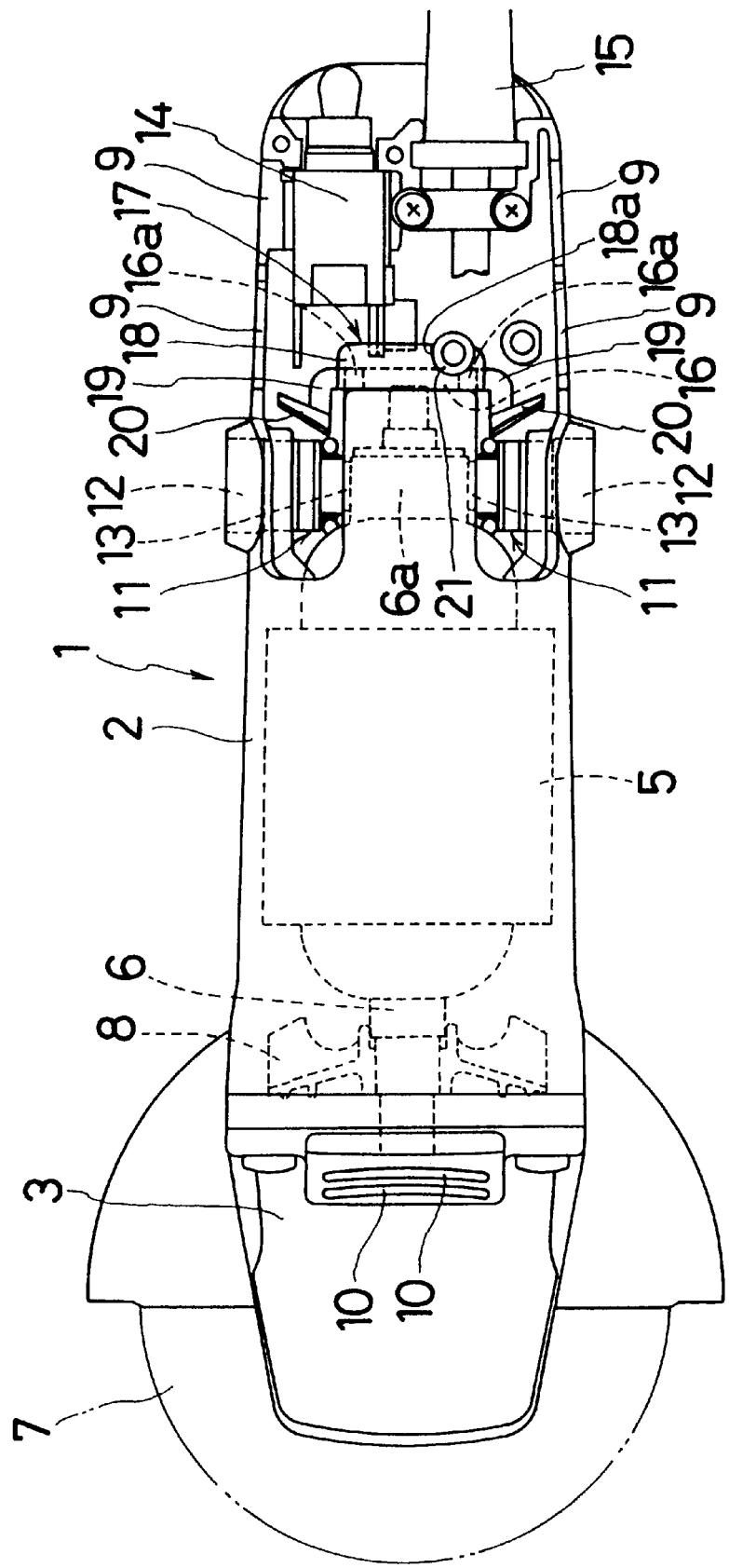
FIG. 1 is a top plan view of an electric power grinder in accordance with the present invention shown with its rear cover removed.

With reference to FIG. 1, there is illustrated an electric power grinder 1 with a rear cover 4 (to be described below) removed. The grinder 1 is encased in a motor housing 2 and provided with a commutator motor 5 with a motor shaft 6 within the motor housing 2. The commutator motor 5 is disposed horizontally so that the motor shaft 6 protrudes into a gear housing 3 located in front (to the left as seen in FIG. 1) of the motor 5. The motor shaft 6 transmits the rotation of the commutator motor 5 to a spindle (not shown) disposed perpendicularly to the motor shaft via bevel gears (not shown), thus rotating a grinding wheel 7 attached to the spindle in order to grind a workpiece. In addition, a fan 8 is fitted on the motor shaft 6 which draws air from the outside of the power tool 1 through a plurality of air inlets 9 formed in the rear portion of the motor housing 2 and discharges the air through a pair of air outlets 10 formed in the front portion of the gear housing 3.

Additionally, a pair of brush assemblies 11 are provided for a commutator 6a at the rear end of the motor shaft 6 within the motor housing 2. Each of the brush assemblies 11 includes a brush holder 12 secured to the motor housing 2 and a carbon brush 13 held by the brush holder. The carbon brushes 13 are pressed against the peripheral surface of the commutator 6a by compression springs (not shown) under normal operating conditions of the grinder 1. In this embodiment, the motor housing 2, the gear housing 3, and the rear cover 4 are all made of aluminum.

Provided in the rear portion of the motor housing 2 are a switch 14 and a power cord 15 which are protected by the rear cover 4 (shown in FIGS. 3 and 4) covering the upper half of the rear portion. A shield 17 protecting the brush assemblies 11 against metal powder is mounted between the rear cover 4 and a bearing case 16 which is integrally formed with the motor housing 2 and supports the rear end of the motor shaft 6. As shown in FIG. 2, the metal powder shield 17 includes a center portion 18 extending horizontally when the grinder 1 is laid on a flat surface, a pair of arms 19 extending symmetrically from the right and left ends of the center portion 18, and a pair of cover portions 20 formed on the outer ends of the arms 19. The cover portions 20 covers the peripheral surfaces of the brush holders and the areas of the motor housing 2 where the brush holders are attached from behind the brush holders 12 and without contacting the holders 12. Each of the cover portions 20 is angled relative to the axis of the motor shaft 6 such that the inner edge of the cover portion is located closer to the front of the tool than is the outer edge, as best shown in FIG. 1. Furthermore, the upper and lower edges of each cover portion 20 are bent towards the brush holder 12 so as to generally match the cylindrical shape of the brush holder 20. Reference numeral 21 indicates a boss for a screw to secure the rear cover 4 to the motor housing 2. In order to avoid interference with the boss 21, the metal powder shield 17 has a cut-out 18a in the center portion 18.

Figure 4:
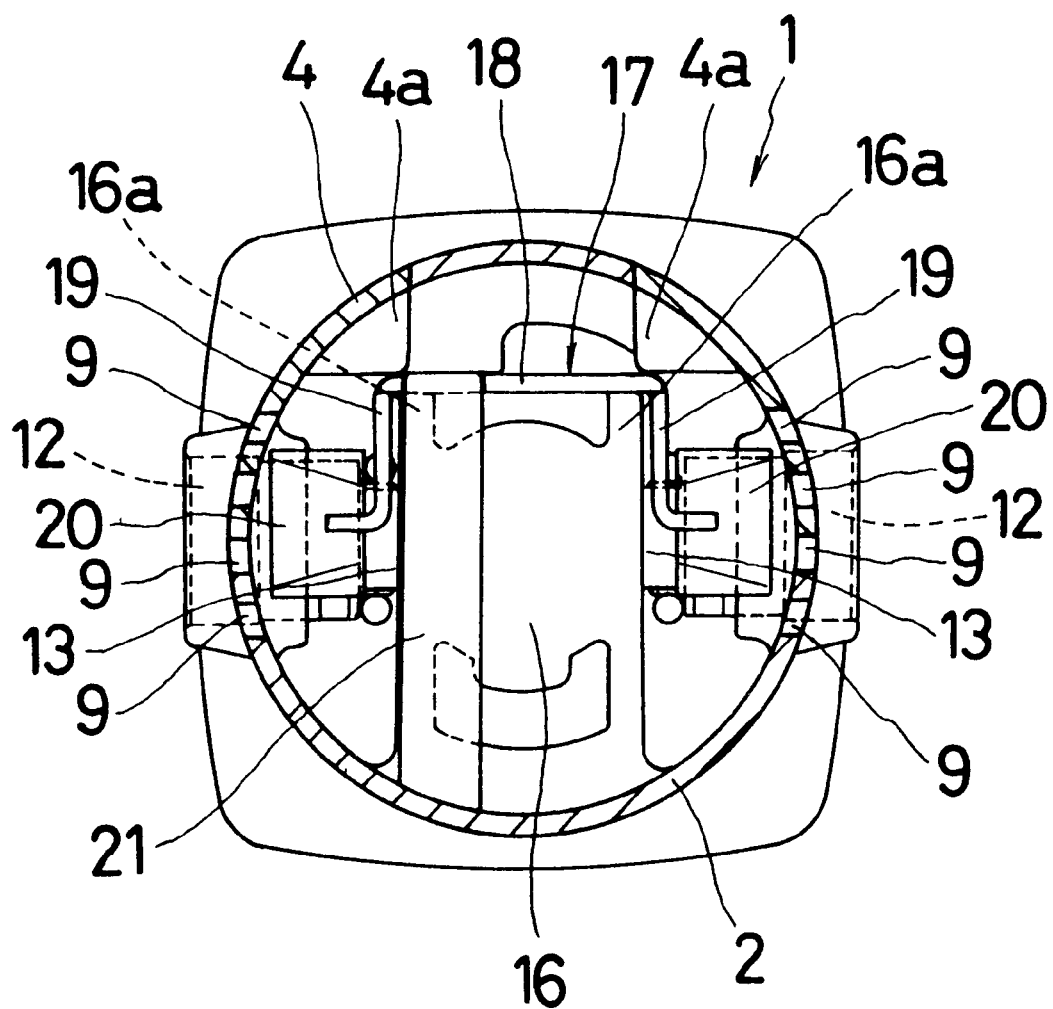
FIG. 4 is a cross-sectional elevation view of a rear portion of the electric power grinder of FIG. 1.

As best shown in FIG. 4, the bearing case 16 has a pair of upward protrusions 16a formed therefrom. Each protrusion 16a has a flat surface at its top on which the center portion is placed. The shield 17 can be set in position in the grinder 1 by placing the center portion 18 of the shield 17 on the protrusions 16a with the rear cover removed and fitting the rear cover 4 in the motor housing 2 to clamp the center portion 18 between the protrusions 16a and a pair of ribs 4a formed on the inner surface of the rear cover 4 (see FIGS. 3 and 4). In this clamped position, the cover portions 20 protect the peripheral surfaces of the brush holders 12 against iron powder drawn by the fan 8 into the grinder 1 through the air inlets 9. The cooling air carrying iron powder flows around the brush holders 12 out of the air outlets 10 without adhering to or being deposited on the brush holders. This effectively prevents electric leakage through the brush assemblies 11 into the housing, thus providing safe operation of the grinder 1.

According to the above-described embodiment, the metal powder shield 17 is a single-piece component that can be easily and quickly set in position by fitting the rear cover 4 back in place. This structure provides the additional advantages of minimizing the number of parts of the grinder and reducing the number of manufacturing steps and the cost of manufacture.

It should be noted that the configuration of the metal powder shield 17 is not limited to the one described in the embodiment. For example, instead of the plate having bends at defined angles, each cover portion 20 may form an approximate semi-sphere or a curved plate, as long as it is provided between the air inlets 9 and the brush holders 12 so as to shield the holder against blasting metal powder.

Moreover, the grinder 1 may be redesigned to have the removable rear cover 4 located on the underside of the grinder 1 as long as the metal powder shield 17 can be securely clamped between the rear cover and the motor housing 2.

Instead of the cover portions 20 being connected with a bridging structure (the center portion 18 and the arms 19) as in the embodiment and clamping it between the rear cover 4 and the bearing case 16, they may be separately provided, for example, adjacent to the brush holders 12 as ribs protruding from the inner surface of the motor housing 2.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A structure for preventing electrical leakage in an electric power tool provided with a commutator motor encased in a housing, a pair of brush holders each including a brush pressed against the commutator of the motor, and a fan driven by rotation of the commutator motor for drawing air from the outside of the electric power tool through at least one air inlet formed in the housing, the structure comprising:

a shield member disposed between the brush holders and the at least one air inlet and blocking air drawn by the fan from the at least one air inlet to the brush holders, said shield member including a center portion mounting a pair of cover portions, said cover portions being disposed close to the brush holders to block air drawn by the fan from the at least one air inlet to the brush holders.

2. A structure in accordance with claim 1, wherein the housing is a split housing which includes a removable part and a fixed part, the removable part fitted on the electric power tool near the brush holders under normal operating conditions such that, when the removable part is fitted in place, the shield member is clamped between the removable part and the fixed part of the housing.

3. A structure in accordance with claim 2, wherein the center portion of said shield member is clamped between the removable part and the fixed part of the housing.

4. A structure in accordance with claim 3, wherein the housing is made of metal.

5. A structure in accordance with claim 3, wherein the material of the housing is selected from the group consisting of aluminum and iron.

6. A structure in accordance with claim 2, wherein each of the cover portions is shaped and oriented to provide a small clearance relative to outer surfaces of the brush holders.

7. A structure in accordance with claim 6, wherein the housing is made of metal.

8. A structure in accordance with claim 6, wherein the material of the housing is selected from the group consisting of aluminum and iron.

9. A structure in accordance with claim 2, wherein the housing is made of metal.

10. A structure in accordance with claim 2, wherein the material of the housing is selected from the group consisting of aluminum and iron.

11. A structure in accordance with claim 1, wherein the housing is made of metal.

12. A structure in accordance with claim 1, wherein the material of the housing is selected from the group consisting of aluminum and iron.

13. A structure in accordance with claim 1, wherein each of said cover portions includes upper and lower edges bent towards the brush holder and each of said cover portions is angled relative to the axis of the commutator motor.

14. A structure for preventing electrical leakage for use in an electric power tool provided with a commutator motor having a rotation axis and encased in a housing, a pair of brush holders each having an outer surface and including a brush pressed against the commutator of the motor, and a fan driven by rotation of the commutator motor for drawing air from the outside of the electric power tool through at least one air inlet formed in the housing, said housing being a split housing which includes a removable pan and a fixed pan, the removable part being fitted on the electric power tool near the brush holders under normal operating conditions such that, when the removable pat is fitted in place, the shield member is clamped between the removable part and the fixed pan of the housing, the structure comprising:

a shield member disposed between the brush holders and the at least one air inlet and spaced apart from the brush holders and the at least one air inlet, for blocking air drawn by the fan from the at least one air inlet to the brush holders, said shield member being substantially symmetrical and including a center portion which is clamped between the removable part and the fixed pat of the housing and has two side edges, a pair of arm portions extending outward from the side edges of the center portion, and a pair of cover portions each having upper and lower edges, said cover portions being connected to the arm portions such that the cover portions are positioned close to the brush holders to block air drawn by the fan from the at least one air inlet to the brush holders when the shield member is clamped in position, wherein the upper and lower edges of each are bent towards the brush holder and each cover portions is angled relative to the axis of the commutator motor.

15. A structure in accordance with claim 14, wherein the center portion is a flat plate clamped between the removable part and the fixed part of the housing.

16. A structure in accordance with claim 15, wherein the housing is made of metal.

17. A structure in accordance with claim 15, wherein the material of the housing is selected from the group consisting of aluminum and iron.

18. A structure in accordance with claim 14, wherein the housing is made of metal.

19. A structure in accordance with claim 14, wherein the material of the housing is selected from the group consisting of aluminum and iron.

20. A structure preventing electrical leakage in an electric power tool provided with a commutator motor encased in a housing, a pair of brush holders each including a brush pressed against the commutator of the motor, and a fan driven by rotation of the commutator motor for drawing air from the outside of the electric power tool tough at least one air inlet formed in the housing, the structure comprising a shield member disposed between the brush holders and the at least one air inlet for blocking air drawn by the fan from the at least one air inlet to the brush holders, wherein the shield member includes a center portion having two side edges and being clamped between the removable part and the fixed pan of the housing, and a pair of arm portions extending outward from the side edges of the center portion, and a pair of cover portions connected to the arm portions such that the cover portions are positioned close to the brush holders to block air drawn by the fan from the at least one air inlet to the brush holders when the shield member is clamped in position.

21. A structure for preventing electrical leakage in an electric power tool provided with a commutator motor encased in a housing and having an axis of rotation, a pair of brush holders each including a brush pressed against the commutator of the motor, and a fan driven by rotation of the commutator motor for drawing air from the outside of the electric power tool through at least one air inlet formed in the housing, the structure comprising a shield member disposed between the brush holders and the at least one air inlet for blocking air drawn by the fan from the at least one air inlet to the brush holders, said shield member being removable and replaceable independent of the brushes, said shield member including a center portion with two side edges, a pair of arm portions extending outward from the side edges of the center portion, and a pair of cover portions having upper and lower edges and being connected to the arm portions, the upper and lower edges of each of said cover portions being bent toward the brush holder and angled relative to the axis of the commutator motor.

22. A structure in accordance with claim 21, wherein the housing is a split housing which includes a removable part and a fixed part, the removable part fitted on the electric power tool near the brush holders under normal operating conditions such that, when the removable part is fitted in place, the shield member is clamped between the removable part and the fixed part of the housing.

23. A structure in accordance with claim 21, wherein the center portion is a flat plate clamped between the removable part and the fixed part of the housing.

\* \* \* \* \*